US005857252A

United States Patent [19]

Jansen

[11] Patent Number: 5,857,252

[45] Date of Patent: Jan. 12, 1999

[54] PRESS FOR INSTALLING UNIVERSAL JOINT BEARING CUPS

[75] Inventor: Kenneth P. Jansen, Abbotsford, Canada

[73] Assignee: Tiger Tool International Incorporated, British Columbia, Canada

[21] Appl. No.: 904,561

[22] Filed: Aug. 4, 1997

[51] Int. Cl.[6] ...................... B23P 19/02

[52] U.S. Cl. ...................... 29/257; 29/251

[58] Field of Search ...................... 29/257, 251, 282, 29/283; 269/299

[56] References Cited

U.S. PATENT DOCUMENTS

| | | | |
|---|---|---|---|
| 2,834,099 | 5/1958 | Gasper . | |
| 3,237,291 | 3/1966 | Kelso | 29/257 |
| 3,307,250 | 3/1967 | Goodwin et al. | 29/257 |
| 4,050,139 | 9/1977 | Okamuro | 29/257 |
| 4,235,004 | 11/1980 | Floyd . | |
| 4,977,660 | 12/1990 | Maynard | 29/251 |
| 5,271,136 | 12/1993 | Skoworodko . | |

*Primary Examiner*—Robert C. Watson

*Attorney, Agent, or Firm*—Oyen Wiggs Green & Mutala

[57] ABSTRACT

A press for inserting bearing cups into a U-joint has an arch member bearing an anvil. A pusher member has a plunger slidably mounted to its inner end. When the pusher member is retracted bias means bias the plunger inwardly. The bias means are capable of holding the press in position on a U-joint. The pusher member is preferably a threaded rod. The bias means preferably acts on a sleeve surrounding the threaded rod. The plunger and anvil have faces having recessed areas to enable the proper installation of bearing cups which are designed to project outwardly from exterior surfaces of a U-joint when installed.

15 Claims, 6 Drawing Sheets

PRESS FOR INSTALLING UNIVERSAL JOINT BEARING CUPS

TECHNICAL FIELD

This invention relates to a press for installing bearing cups in a universal joint. Presses according to invention may be particularly well adapted for installing and removing bearing cups in universal joints having bearing cups which protrude from the yoke of the universal joint when the bearing cups are installed. A press according to the invention may be adapted to allow its additional use for removing universal joint bearing cups.

BACKGROUND

Universal joints are used to accommodate slight changes in direction of drive lines, such as the drive line extending between the transmission and differential in a truck drive train. Universal joints (or "U-joints") include a pair of yokes connected by an X-shaped cross member. Trunnions on the cross member extend into bearing cups which mount in apertures in the yokes. Periodically it can be necessary to remove the bearing cups either to permit removal of the U-joint or to service the U-joint. After the bearing cups have been removed and any necessary service completed, the bearing cups must be reinstalled. Various tools exist for pressing bearing cups into place in U-joints and/or pulling U-joints apart. One disadvantage of currently available tools is that they are not readily adapted to the task of accurately installing bearing cups in U-joints which, by their design, require the outer ends of properly installed bearing cups to protrude slightly outwardly from outer surfaces of the yokes in the universal joint. The Series 140, 170 and 250 U-joints available from the Dana Spicer Corporation of Holland, Ohio have this feature of construction. There is a need for a tool which can quickly and accurately install such bearing cups without under or over driving them.

Universal joints are often located in areas where other components block easy access. It can be either economically impractical or physically impossible to service such universal joints from more than one side. It can be difficult to hold currently available tools in place on the universal joint in preparation for the installation or removal of bearing cups. What is needed is a tool which can be easily mounted to the yoke assembly of a universal joint and then operated to assemble the universal joint.

SUMMARY OF THE INVENTION

This invention provides a press for pressing bearing cups into position in universal joints. One aspect of the invention provides a press which comprises: an arch member dimensioned to extend around a yoke portion of a universal joint; an anvil on the arch member; a pusher member mounted to the arch member at a location opposed to the anvil; a plunger slidably mounted to the pusher member; a sleeve around the pusher member, the sleeve slidably mounted to the arch member; and, bias means for biasing the sleeve toward the anvil. The pusher member is movable from a retracted position, along an axis toward the anvil.

The plunger is movable relative to the pusher member from a first position toward the anvil along the axis. When the pusher member is in its retracted position, the bias means urges both the sleeve and the plunger toward the anvil relative to the pusher member.

In a preferred embodiment the pusher member comprises a threaded rod threadedly engaged with the arch member and the plunger comprises a stem projecting into an axial hole in a first end of the threaded rod. The plunger can rotate relative to the threaded rod. A ball bearing is preferably located in the axial hole adjacent an inner end of the stem. The ball bearing eases rotation of the plunger when the plunger is under pressure.

In the preferred embodiment the anvil and the plunger each comprise a body having a generally planar bearing surface lying perpendicular to the axis surrounding a recessed area on the axis. The recessed areas each dimensioned to receive an outer end of a bearing cup. The depth of the recessed areas corresponds to a distance that bearing cups installed with the press should project out from adjacent surfaces of universal joints.

In preferred embodiments of the invention the sleeve comprises an outer end bearing an inwardly projecting flange and the bias means comprises a coil spring extending around the pushing member and bearing against the flange. Preferably the stem extends through a central aperture in the flange and the plunger comprises a head having a diameter larger than a diameter of the central aperture. Most preferably the anvil is removably affixed in an aperture in the arch member.

BRIEF DESCRIPTION OF THE DRAWINGS

In drawings which illustrate specific embodiments of the invention, but which should not be construed as restricting the spirit or scope of the invention in any way.

DESCRIPTION

Figure 1:
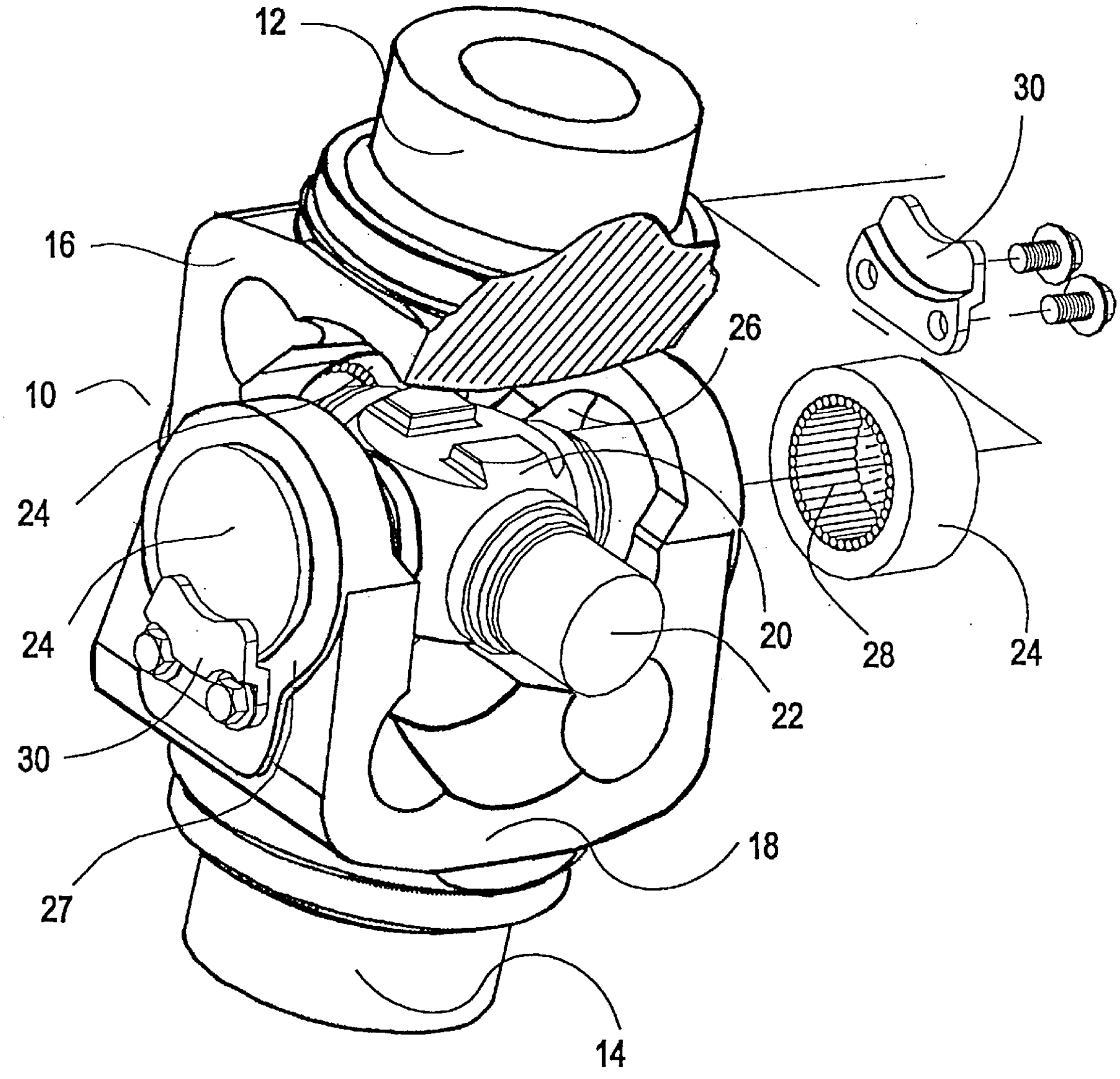
FIG. 1 is a perspective view of a drive shaft having bearing cups which may be pressed into place using the press of the invention.

FIG. 1 shows a universal joint 10 which has been partially disassembled. Universal joint 10 joins drive shaft segments 12 and 14. Universal joint 10 comprises a yoke 16 connected to drive shaft segment 12 and a yoke 18 connected to drive shaft segment 14. Yokes 16 and 18 are rotated by 90 degrees relative to each other. An X-shaped cross member 20 connects yokes 16 and 18. Cross member 20 comprises trunnions 22 which project into bearing cups 24 mounted in apertures 26 in yokes 16, 18. Trunnions 22 bear against a plurality of rollers 28 in each bearing cup 24.

To assemble universal joint 10 it is necessary to press bearing cups 24 inwardly from the outsides of yokes 16, 18 into apertures 26 until cups 24 cover trunnions 22. Bearing cups 24 must be pressed in to a specific depth in apertures 26 as specified by the manufacturer of the universal joint. The manufacturer's specifications may require the outer surfaces of installed bearing cups 24 to project outwardly by a specified distance from surfaces 27 on universal joint 10. When bearing cups 24 have been fully inserted over trunnions 22 then they are fastened in place with retainers 30. It can take large forces, in some cases in excess of 5,000 pounds, to press bearing cups 24 into place in a large U-joint 10.

Figure 2:
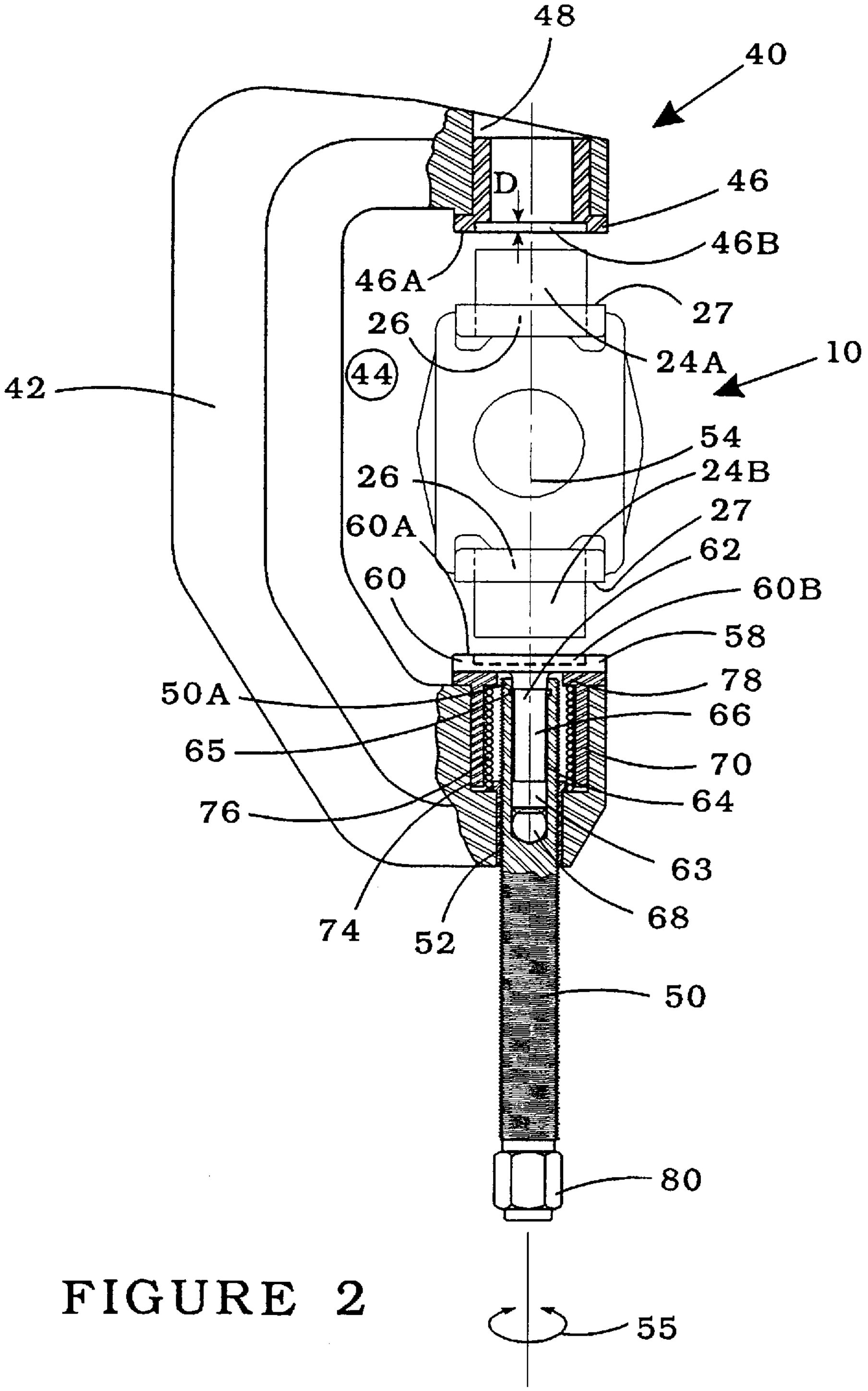
FIG. 2 is a partially cut away side elevational view of a press according to the invention.

FIG. 2 illustrates a press 40 according to the invention. Press 40 comprises a generally C-shaped frame or "arch member" 42 having a throat 44 large enough to pass around universal joint 10. An anvil 46 is located on arch member 42. Anvil 46 may conveniently comprise a body fitted into an aperture 48 in arch member 42. This permits anvil 46 to be conveniently replaced with other anvils for use in association with different universal joints and allows anvil 46 to be easily replaced if it is damaged. If aperture 48 is large enough then anvil 46 can be removed and press 40 can be used to disassemble universal joints, as discussed below.

A pusher member is connected to arch member 42 on a side of throat 44 opposed to anvil 46. In the embodiment of FIG. 2, the pusher member comprises a threaded rod 50 threadedly engaged in an aperture 52 which extends through arch member 42 into throat 44. The inner end 50A of threaded rod 50 can be moved longitudinally toward or away from anvil 46 along an axis 54 by rotating threaded rod 50 about axis 54 as indicated by arrow 55.

A plunger 58 is slidably mounted to threaded rod 50. Plunger 58 can move longitudinally along axis 54 with respect to threaded rod 50. Preferably plunger 58 comprises a head portion 60 and a stem 62. Stem 62 is slidably received in an axial hole 64 in threaded rod 50. A hardened ball bearing 68 is located in axial hole 64 adjacent an inner end 63 of stem 62. Inner end of stem 62 is preferably indented slightly to receive ball bearing 68. Plunger 58 is rotatable about axis 54 relative to threaded rod 50.

Plunger 58 is preferably removable from threaded rod 50 so that it can be replaced or interchanged with plungers adapted for work on different U-joints. Plunger 58 is preferably held captive on the end of threaded rod 50 during normal use so that it does not accidentally fall off of threaded rod 50. Plunger 58 may, for example, be retained in axial hole 64 by a detent mechanism.

In the preferred embodiment shown in the drawings, the detent mechanism comprises an elastomer o-ring 65 situate in a groove machined in the bore of axial hole 64. A narrowed portion 66 of stem 62 passes through o-ring 65 when plunger 58 is installed in axial hole 64. Plunger 58 can slide quite freely in axial hole 64 until o-ring 65 abuts against a chamfered step which defines the inner end of narrowed portion 66. Further removal of plunger 58 from axial hole 64 requires the application of force to pull the end of stem 62 which is innermost in axial hole 64 through o-ring 65.

A sleeve 70 extends around that portion of threaded rod 50 which projects into throat 44 from arch member 42. Sleeve 70 comprises a tubular body slidably received in a channel 74 in arch member 42. Channel 74 is preferably coaxial with threaded aperture 52. The range of motion of sleeve 70 is limited by retaining means which prevent sleeve 70 from falling completely out of channel 74. The retaining means may comprise, for example, one or more pins or screws (not shown) projecting from arch member 42 into one or more grooves (not shown) in sleeve 70. Abutment of the pin or screw with end walls of the groove restricts longitudinal motion of sleeve 70 in channel 74.

Figure 3A:
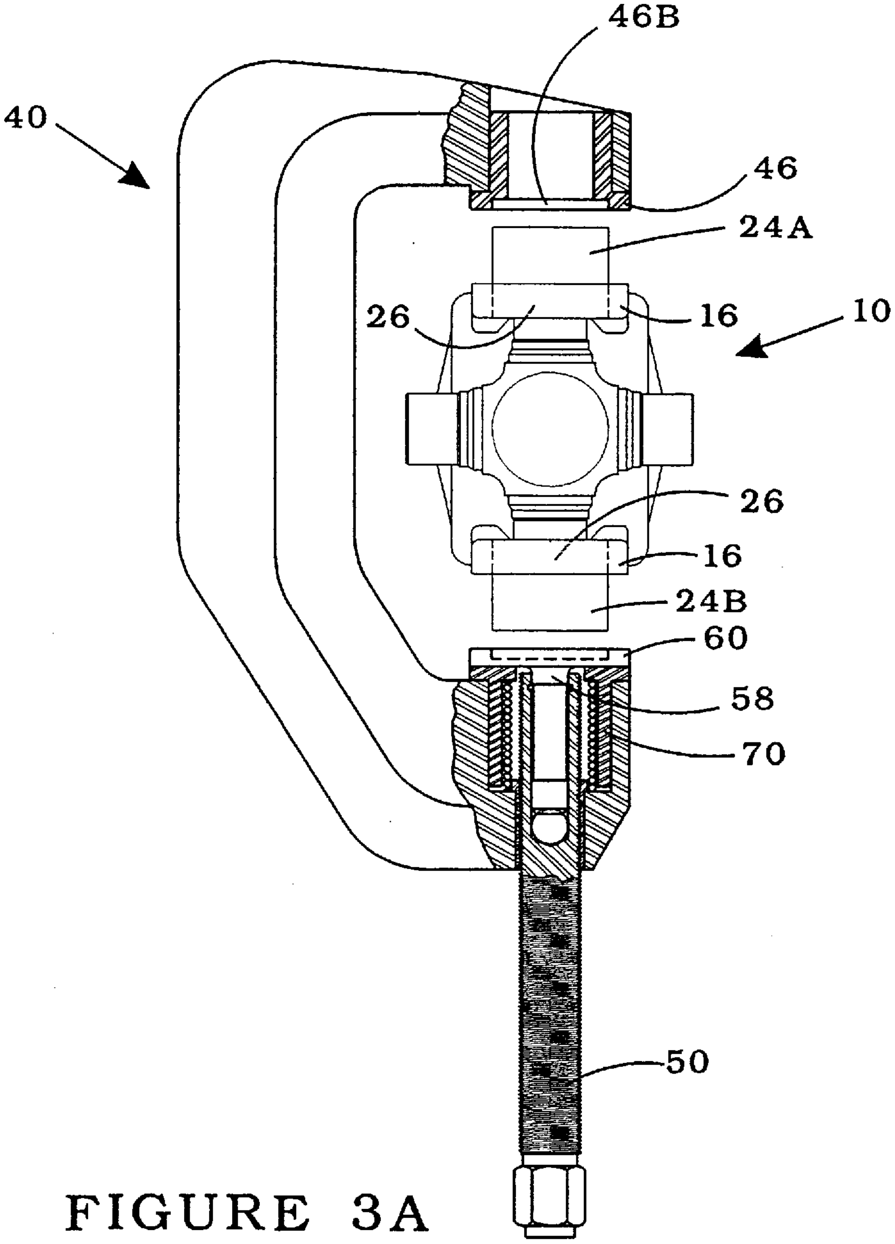
FIGS. 3A, 3B and 3C are a sequence of side elevational views showing a press according to the invention being used to perform steps for pressing bearing cups in a universal joint into place; and, FIG. 4 is a partial expanded view showing details of construction of the sleeve and plunger portion of a press according to the invention.

Bias means are provided to bias sleeve 70 toward anvil 46. In the embodiment of FIG. 2, the bias means comprises a coil spring 76 which bears against arch member 42 at an inside end of sleeve 70 and against a flange 78 which projects radially inwardly toward threaded rod 50 at an outside end of sleeve 70. When threaded rod 50 is in its retracted position, away from anvil 46, as shown in FIGS. 2 and 3A, then the outside end of sleeve 70 presses against the rear face of head 60 of plunger 58. Spring 76 biases sleeve 70 and plunger 58 together toward anvil 46 relative to threaded rod 50. A hexagonal head 80 is provided on an outer end of threaded rod 50 to allow threaded rod 50 to be turned by means of a wrench.

Anvil 46 has a generally planar portion (or "bearing surface") 46A surrounding a circular recessed area 46B. Recessed area 46B is dimensioned to accept the outer end of a first bearing cup 24A. The depth "D" of recessed area 46B relative to generally planar area 46A is equal to the desired amount of protrusion of bearing cups 24 past outer surfaces 27 of U-joint 10 when bearing cups 24 are properly installed in U-joint 10. Outer surfaces 27 lie adjacent apertures 26. Head 60 of plunger 58 also comprises a body having a generally planar surface portion (or "bearing surface") 60A extending in a plane perpendicular to axis 54 and a central recessed area 60B capable of receiving the outer end of a second bearing cup 24B. The depth of recessed area 60B relative to planar area 60A is also equal to D.

While the currently preferred embodiment of the invention is illustrated in the drawings, threaded rod 50 could be replaced with an alternative pusher member for forcibly pushing plunger 58 toward anvil 46. For example, threaded rod 50 could be replaced with a hydraulically driven pin capable of being forced toward anvil 46 along axis 54 without departing from the broad scope of the invention.

The operation of the press shown in FIG. 2 will now be described with reference to FIGS. 3A, 3B and 3C. As shown in FIG. 3A, a universal joint 10 is prepared by seating bearing cups 24A and 24B in corresponding apertures 26 in yoke 16 by hand. In general, it is not possible to insert bearing cups 24 very far into apertures 26 by hand. Press 40 is prepared by rotating threaded rod 50 until threaded rod 50 is in its retracted position.

Next, plunger 58 and sleeve 70 are manually retracted away from anvil 46. With plunger 58 and sleeve 70 retracted, press 40 can be placed around universal joint 10 as shown in FIG. 3A. Anvil 46 is adjacent one bearing cup 24A and head 60 of plunger 58 is adjacent a second opposed bearing cup 24B. Anvil 46 can then be positioned so that the outer end of bearing cup 24A is received in recessed area 46B.

Figure 3B:
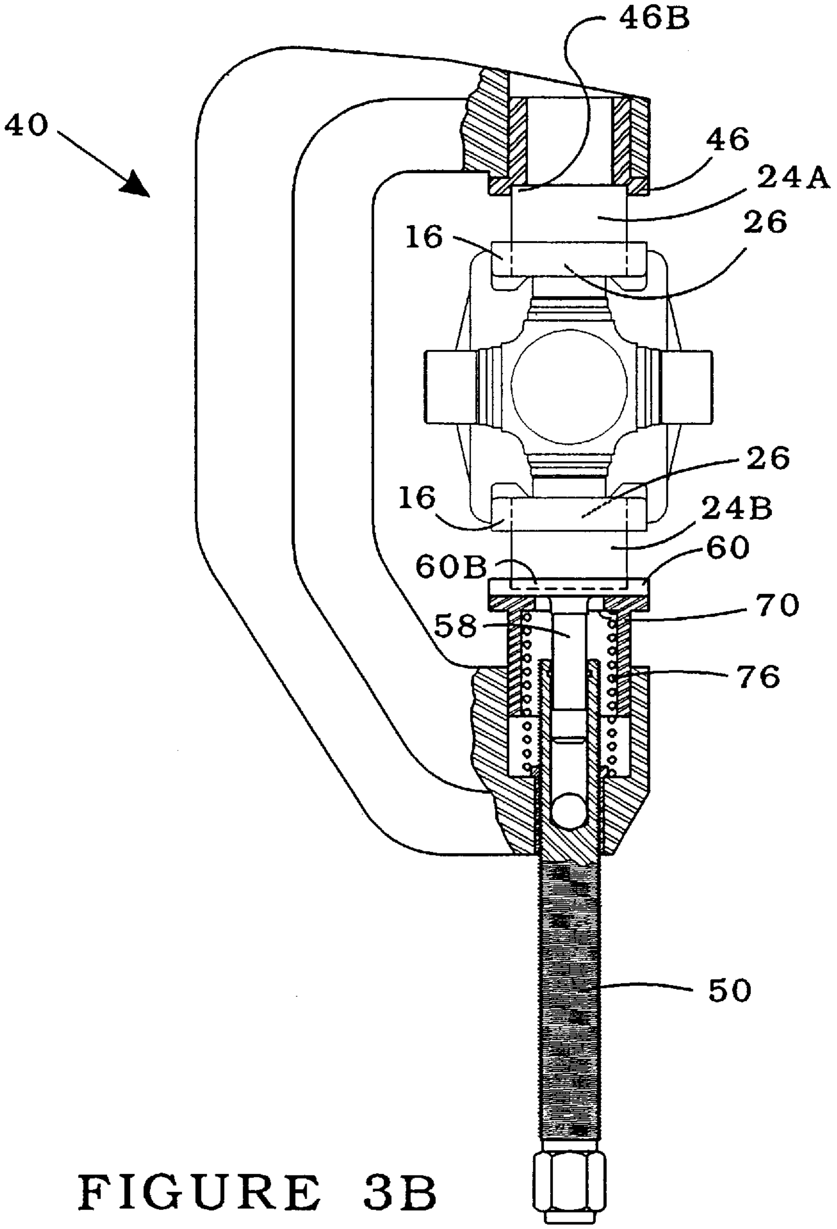

Next, as shown in FIG. 3B, plunger 58 and sleeve 70 are released. Spring 76 then urges sleeve 70 and plunger 58 into contact with bearing cup 24B. In general, anvil 46 is placed over bearing cup 24A first, plunger 58 is aligned with bearing cup 24B and then plunger 58 and sleeve 70 are released over bearing cup 24B. Because plunger 58 is slidably mounted to the end of threaded rod 50 this is possible even though threaded rod 50 does not necessarily move.

The outer end of bearing cup 24A is received in recess 46B in anvil 46. The outer end of the opposed bearing cup 24B is engaged in recess 60B in head 60 of plunger 58. Spring 76 retains tool 40 on bearing cups 24A and 24B. The pressure exerted by spring 76 also tends to hold bearing cups 24A and 24B in position aligned with apertures 26 in yoke 16.

Figure 3C:
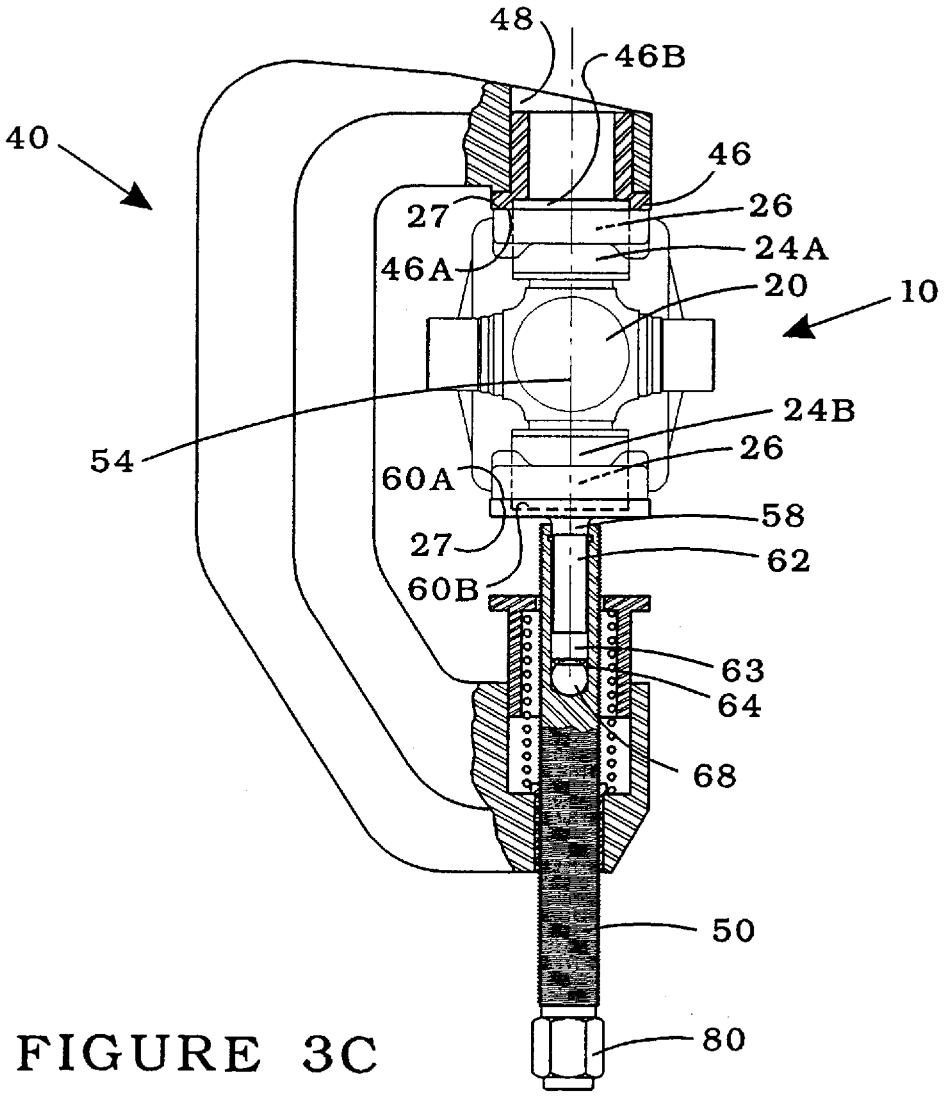
Figure 4:
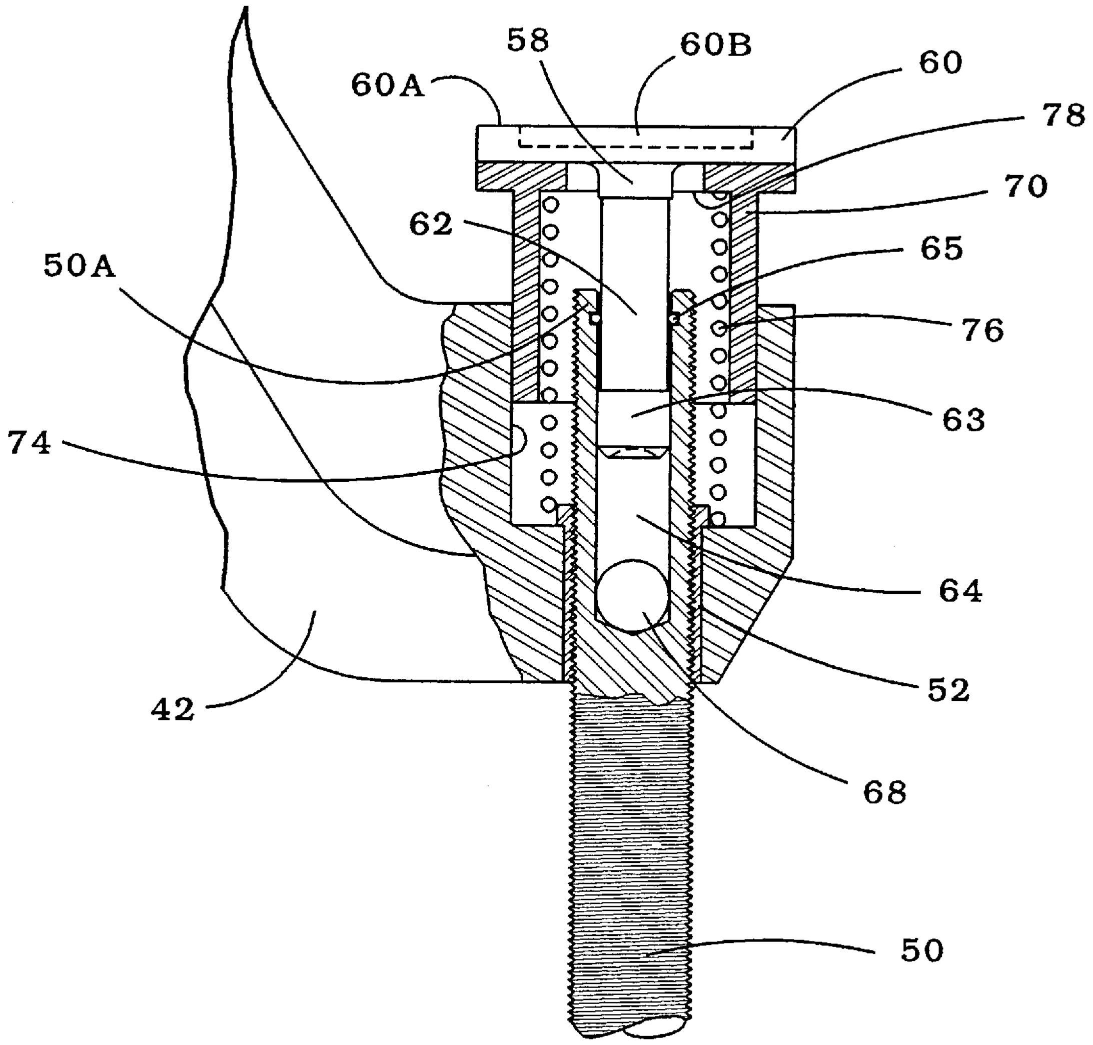

Finally, as shown in FIG. 3C, the installation of bearing cups 24A and 24B is completed by rotating threaded rod 50 about axis 54 (for example with the use of a wrench engaging head 80). Threaded rod 50 is advanced longitudinally along axis 54 until ball bearing 68 is at the bottom of axial hole 64 and in contact with the inner end 63 of stem 62. When this happens, and threaded rod 50 is further rotated, threaded rod 50 begins to push plunger 58 toward anvil 46, thereby driving bearing cups 24A and 24B into place in corresponding apertures 26 in universal joint 10. Eventually, face 46A of anvil 46 and face 60A of plunger 58 contact surfaces 27 on universal joint 10. After this point, it is impossible to insert bearing cups 24 any farther. The depths of recesses 46B and 60B ensure that bearing cups 24A and 24B are not over driven and are left projecting past surfaces 27 on universal joint 10 by the desired distance D (FIG. 2).

Press 40 may be constructed in a manner which allows press 40 to be configured to dismantle a U-joint 10. A press 40 could be configured to dismantle U-joint 10 by removing anvil 46 from aperture 48 and by replacing plunger 58 with a plunger having a head no larger than the end faces of bearing cups 24. In presses 40 which will be used to disassemble universal joints 10, aperture 48 should be large enough to receive and pass a bearing cup 24. Surfaces of arch member 42 adjacent aperture 48 on the side facing the plunger should be capable of bearing against surfaces 27 of a universal joint 10 adjacent apertures 26.

A U-joint 10 may then be dismantled by placing press 40 around U-joint 10 and turning threaded rod 50 to drive one bearing cup 24A out of U-joint 10 through aperture 48. Press 40 can then be reversed and used to press on cross member 20 to push the opposed bearing cup 24B out of its corresponding aperture 26 and into aperture 48 in arch member 42.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A press for pressing bearing cups into a yoke of a universal joint, the press comprising:

(a) an arch member dimensioned to extend around a yoke portion of a universal joint;

(b) an anvil on the arch member;

(c) a pusher member mounted to the arch member at a location opposed to the anvil, the pusher member movable from a retracted position, along an axis toward the anvil;

(d) a plunger slidably mounted to the pusher member, the plunger movable relative to the pusher member from a first position toward the anvil along the axis;

(e) a sleeve around the pusher member, the sleeve slidably mounted to the arch member; and, (f) bias means for biasing the sleeve toward the anvil; wherein, when the pusher member is in its retracted position, the bias means urges both the sleeve and the plunger toward the anvil relative to the pusher member.

2. The press of claim 1 wherein the pusher member comprises a threaded rod threadedly engaged with the arch member.

3. The press of claim 2 wherein the plunger comprises a stem projecting into an axial hole in a first end of the threaded rod.

4. The press of claim 3 comprising a ball bearing in the axial hole adjacent an inner end of the stem.

5. The press of claim 4 wherein the anvil comprises a body having a generally planar bearing surface lying perpendicular to the axis surrounding a recessed area on the axis dimensioned to receive an outer end of a bearing cup.

6. The press of claim 5 wherein the recessed area is circular and centered on the axis.

7. The press of claim 4 wherein the anvil and the plunger each comprise a body having a generally planar bearing surface lying perpendicular to the axis surrounding a recessed area on the axis, the recessed areas each dimensioned to receive an outer end of a bearing cup.

8. The press of claim 7 wherein the recessed areas are circular and centered on the axis.

9. The press of claim 3 wherein the sleeve comprises an outer end bearing an inwardly projecting flange and the bias means comprises a coil spring extending around the pushing member and bearing against the flange.

10. The press of claim 9 wherein the stem extends through a central aperture in the flange and the plunger comprises a head having a diameter larger than a diameter of the central aperture.

11. The press of claim 9 wherein the anvil and the plunger each comprise a body having a generally planar bearing surface lying perpendicular to the axis surrounding a recessed area on the axis for receiving a bearing cup and the outer end of the sleeve bears against an inner face of the plunger body when the pusher member is in its retracted position.

12. The press of claim 11 wherein the recessed areas are circular and centered on the axis.

13. The press of claim 12 wherein the pusher member has a head to receive a wrench.

14. The press of claim 12 wherein the anvil is removably affixed in an aperture in the arch member.

15. The press of claim 14 wherein the aperture in the arch member is dimensioned to pass a bearing cup.

* * * * *